United States Patent [19]

Bohrer

[11] 4,130,537

[45] Dec. 19, 1978

[54] ASBESTOS FREE FRICTION ELEMENT

[75] Inventor: George J. Bohrer, Pittsburgh, Pa.

[73] Assignee: H. K. Porter Company, Inc., Pittsburgh, Pa.

[21] Appl. No.: 765,006

[22] Filed: Feb. 2, 1977

[51] Int. Cl.² ............................ C08K 3/40; C08K 5/06
[52] U.S. Cl. ........................................ 260/38; 106/36; 428/273; 428/295; 428/392
[58] Field of Search ........................ 260/38, DIG. 39; 428/273, 295, 392; 106/36

[56] References Cited

U.S. PATENT DOCUMENTS

| 2,453,188 | 11/1948 | Blume et al. ............... 260/DIG. 39 |
| 3,743,069 | 7/1973 | Barnett et al. ................... 192/107 M |
| 3,922,241 | 11/1975 | Barker et al. ....................... 260/38 X |
| 3,925,286 | 12/1975 | Fahey ............................... 260/846 X |
| 3,959,194 | 5/1976 | Adelmann ................... 260/DIG. 39 |
| 3,967,037 | 6/1976 | Marzacchi et al. .................. 428/392 |

Primary Examiner—Sandra M. Person
Attorney, Agent, or Firm—Robert D. Yeager

[57] ABSTRACT

A composition for use in forming an asbestos free friction element includes a cross-linkable polymeric binder and glass fibers with a sufficient amount of an infusible organic fiber to mitigate the aggressive behavior of the friction element during operation.

37 Claims, No Drawings

ASBESTOS FREE FRICTION ELEMENT

BACKGROUND OF THE INVENTION

1. Field of the Invention

This invention relates to a composition for use in forming shaped friction elements such as clutch facings, brake pads or linings, and the like. The invention permits such friction elements to possess properties comparable with known friction elements yet, consonant with the increased demand to protect workers against exposure to airborne substances that are deleterious to their health, eliminates asbestos as the conventional components of such friction elements.

2. Description of the Prior Art

The mineral asbestos has been long associated with the manufacture of articles whose use requires that they withstand heat. Even before the days of Marco Polo, who reported to fellow Venetians upon his travels to Siberia where he saw the fibrous substance woven into cloth which remained incombustible when thrown into fire, the heat-resistive property of asbestos was known. It is not surprising, therefore, that asbestos has been the major component of friction elements such as those used in the brake and clutch assemblies of automotive vehicles where severe operating temperatures and pressures must be withstood. U.S. Pat. Nos. 1,608,165; 2,025,039; 2,218,535; 2,431,883; 2,702,770; 3,068,131; and 3,437,546 are representative of the period, spanning almost 50 years, that asbestos dominated as the principal active friction ingredient in friction materials.

When the asbestos used in friction elements is in the form of a yarn, the yarn is commonly provided with a core of fine metal wire to provide the tensile strength needed in handling the yarn during fabrication of a friction element. Workers in the art found it necessary, however, to reinforce the asbestos fibers with a stronger fibrous substance such as cotton in order to spin the asbestos into a yarn. These workers thus commonly preferred a yarn composed of about 75 to 85 percent asbestos and 15 to 25 percent cotton; see e.g. U.S. Pat. Nos. 2,052,808; 2,130,520; 2,855,081; 3,068,131; 3,365,041; and 3,429,766. The teachings of these patents make clear that the introduction of cotton or some other fiber into the asbestos was to improve its spinability or the tensile strength of the yarn, and thus the addition was to be tolerated rather than encouraged. In fact, the need for including a limited amount of other fibers such as cotton in asbestos yarn intended for use in friction elements has become so well accepted that more recent patent disclosures refer only to "asbestos yarn" without specifically mentioning such other fibers; see e.g. U.S. Pat. Nos. 3,437,546 and 3,600,258. Other teachings have suggested the use of cellulosic fibers in combination with asbestos to minimize the undesirable characteristic of "fading" under the frictional heat of operation; see U.S. Pat. No. 2,702,770.

Since the passage of the Occupational Safety and Health Act of 1970, the Occupational Safety and Health Administration (OSHA) has set standards for occupational exposure to asbestos and it appears that these standards will become increasingly rigid to the point where zero exposure may be required. The present OSHA standards, among other things, limit the number of asbestos fibers per unit volume of air to which a worker may be exposed over an established period of time. The imposition of such standards was brought about by evidence that exposure to asbestos may be carcinogenic to man.

Asbestos dust probably is present at highest concentrations, with the exception of asbestos mines, in asbestos textile plants where the asbestos fibers are prepared, carded, spun, woven, etc. However, asbestos dust is also present in plants at which friction materials are fabricated. Depending upon particular plant conditions, operations such as mixing, forming, pressing and baking asbestos containing materials, grinding, sanding, cutting and drilling asbestos-containing articles, and bonding, riveting, inspecting and packing finished asbestos-containing friction elements may all contribute to the presence of airborne asbestos. It is thus a worthy (and perhaps in the future a mandatory) objective to eliminate asbestos as a component of friction materials.

The use of glass fibers in friction products has been suggested. Some of the earlier of these suggestions involved the use of glass fibers to reinforce asbestos-containing friction elements, first as backing materials for conventionally produced friction elements (e.g. U.S. Pat. Nos. 3,068,131 and 3,365,041), and then as part of the friction facing itself (e.g. U.S. Pat. Nos. 3,429,766; 3,526,306; 3,520,390; and 3,600,258). The stated purpose for the use of glass fibers was to increase the burst strength of the friction elements (Burst strength is an index of the centrifugal forces which can be withstood by a friction element without disintegrating. The test of burst strength is usually carried out at elevated temperatures).

More recently, it has been suggested that glass fibers alone or together with metal wire or chips may be used to form friction elements containing no asbestos (e.g. U.S. Pat. Nos. 3,743,069 and 3,967,037). In these cases, it is stated that the glass fibers not only improve burst strength and wear-resistance, particularly at elevated temperatures, but also serve as the active friction ingredient. Generally, such friction elements are fabricated by known techniques using a conventional, heat-curable organic binder to bond the glass fibers together in a mass.

It has been found however, that glass, as the active friction ingredient of a friction element, is too "aggressive" in most commercial applications in comparison with conventional asbestos-containing friction facings. This aggressiveness is often manifested during simulated or actual operating conditions as noise, vibration, and/or erratic friction effects when the friction element is engaged with a mating surface, none of which manifestations can be tolerated by the highly-competitive automotive industry.

The present invention overcomes the shortcomings of known compositions for friction elements in two ways: (1) the invention provides a friction material composition which does not require asbestos as a component, yet produces operating characteristics comparable with those of asbestos-containing friction elements; and (2) the invention permits the use of glass as an active friction ingredient of friction elements without the attendant operational shortcomings described above.

SUMMARY OF THE INVENTION

A composition for use in forming an asbestos-free friction element with reduced aggressiveness is comprised of infusible organic fiber and glass fiber reinforcing constituents, and a cross-linkable polymeric binder.

The binder, when cross-linked, forms a matrix for the glass and infusible organic fibers in the friction element.

DETAILED DESCRIPTION OF THE INVENTION

The cross-linkable polymeric binder useful in the practice of the invention is that usually employed in friction elements and referred to as "binder" or "binder cement".

The binder contains a cross-linkable resin such as a cross-linkable phenolic resin. The term "phenolic resin", as used herein, is intended to mean and include thermosetting resins based on the condensation of an aldehyde and a phenol. The aldehydes useful in forming the phenolic resins are, but not limited to, formaldehyde, acetaldehyde, acrolein, and the like. The phenols useful in forming the phenolic resin are those phenols capable of electrophilic aromatic substitution; for example, phenol, resorcinol, catechol, aminophenol, and the like. Both the resole and novalac type phenolic aldehyde resins are contemplated to be within the scope of the term "phenolic resin". The resole resins are characterized by their formation with base catalysis and the novalac resins are characterized by their formation with acid catalysis. Generally, the resole resins are more highly methylolated than the novalacs. The choice between the resole and the novolac resin in a particular system is contingent on the other materials present in the system. In the binder, phenol formadehyde novalac resins are among those most commonly used and preferred.

In addition to the phenolic resin the binder cement may and usually does contain an elastomer. The term "elastomer" as used herein, is intended to mean and include both natural and synthetic rubbers. "Natural rubber" as used herein is the elastic solid obtained from the sap or latex of the Havea tree, whose major constituent is the homopolymer of 2-methyl-1,3-butadiene (isoprene). "Synthetic rubber" as used herein is intended to mean and include the hydrocarbon chain rubbers which are based upon at least 2 percent of a conjugated unsaturated monomer, the conjugation being in the 1–3 position in the monomer chain and the final polymer, in its uncured state, having an extensibility of at least 200 percent and a memory of at least 90 percent when stretched within its extensibility limits and released instantaneously. The conjugated unsaturated monomers which are used in the preparation of the synthetic hydrocarbon chain rubber are, but are not limited to, chloroprene, butadiene, isoprene, cyclopentadiene, dicyclopentadiene and the like. Other olefins capable of free radical, anionic, or cationic interpolymerization to form the hydrocarbon chain with the conjugated unsaturated monomer are useful in forming the synthetic rubbers. These olefins are typically monoethylenically unsaturated monomers. These monoethylenically unsaturated monomers are, but are not limited to, the acrylic monomers such as methacrylic acid, acrylic acid, acrylonitrile, methacrylonitrile, methyl methacrylate, methylacrylate, ethylacrylate, ethylmethacrylate and the like; mono-olefinic hydrocarbons such as ethylene, propylene, styrene, alphamethyl-styrene and the like; and other functional monounsaturated monomers such as vinyl pyridine, vinyl pyrrolidone and the like functional vinylic monomers. Also within the scope of the term synthetic rubber are the non-hydrocarbon chain rubbers such as silicone rubbers. Preferably, the cross-linkable polymeric binder contains natural rubber and/or a synthetic hydrocarbon chain rubber.

In selecting an elastomer for use in the binder composition, care should be taken to assure that the chemical composition of the particular elastomer does not interfere with the functioning or lifetime of the friction element and apparatii associated therewith.

In addition to the polymeric constituents of the binder, other known materials for forming binders may be used.

Vulcanizing agents may be added to the binder to cross-link the unsaturated rubbers. Exemplary of such vulcanizing agents are sulphur, zinc oxide (for vulcanizing neoprene), peroxides, dinitrosobenzene and the like. Vulcanization accelerators may be used such as zinc oxide, stearic acid and the like.

Polyamines may be added to the binder to promote the cross-linking and interraction of the phenolic resin and the elastomer. Typical polyamines are hexamethylene tetraamine, diethylene triamine, tetraethylene pentamine, diphenylguanidine and the like.

Fillers may be added to the binder to modify the final physical properties and reduce the expense of the friction element with such common fillers including carbon black, clay, graphite, lead sulphate, rottenstone, mica, lime, and the like.

Typical binder compositions and methods for their preparation are disclosed by U.S. Pat. Nos. 2,702,770; 3,437,546; 2,196,570; 3,520,390; and 3,959,194, all incorporated herein by reference.

Typically, the binder composition with all attendant ingredients is dissolved and/or dispersed in a solvent for the soluble polymeric constituents. Sufficient solvent is provided to obtain the proper binder solution/dispersion viscosity for combination with the glass and the organic fiber to obtain the proper ratio of binder to reinforcing constituents. The infusible organic fibers and the glass fibers taken together are preferably present in the range of 20 to 75 percent by weight based on the total weight of the final friction element and more preferably in the range of 30 to 65 percent by weight. If the level of organic and glass fibers is too low, inadequate reinforcement of the friction element will result. If the level of organic and glass fibers is too high, excessive wear will be demonstrated by the friction element.

The glass fibers useful in the practice of the invention are those typically utilized for reinforcing cured resinous materials. The glass fiber surface must be treated with a bridging composition to effectively bond (chemically and/or physically) the glass to the matrix of the friction element.

During formation, the individual glass filaments are treated with a size which contains a coupling agent that links the glass surface to the matrix. These coupling agents include both the silane coupling agents and the Werner complex type coupling agents. Typical silane coupling agents are the vinyl, alkyl, beta-chloropropyl, phenyl, thio-alkyl, thio-alkary, methacrylate, epoxy, and mercaptosilanes, their hydrolysis products, polymers of their hydrolysis products and mixtures of any of these. Werner type coupling agents are those which contain a trivalent nuclear atom such as chromium, coordinated with an organic acid such as methacrylic acid. Such agents are described in U.S. Pat. No. 2,611,718, incorporated herein by reference.

Usually the total sizing composition is employed at a level of below about two percent weight based on the weight of the glass and more preferably in the range of 0.2 to 1.0 percent by weight, while the coupling agent is about 2 to 6 percent by weight of the size solids. Typical sizing compositions and methods may be found in U.S. Pat. Nos. 3,933,711 and 3,946,132, incorporated herein by reference.

In addition to sized glass fibers, coated glass fibers may be used as the fibrous glass constituent of the friction element. Coated glass fibers are distinguished from sized glass fibers in that the composition at the surface of the former is present from about 5 to 50 percent by weight and usually 15 to 35 percent by weight based on the weight of the glass. The presently preferred glass form used in the practice of the invention is RFL-coated glass fiber. The term "RFL" as used herein is intended to mean and include the dried residue of a coating composition which contained a natural rubber and/or a synthetic hydrocarbon chain rubber and a phenolic resin. Preferably the elastomeric component of the RFL contains between about 5 to 15 percent of a polymerized vinyl pyridine monomer and a resorcinol formaldehyde resin. RFL-coated glass fibers are typically formed by coating individual sized glass fibers with an RFL coating composition. The coating composition is comprised of the elastomer, in latex form, and the phenolic resin in aqueous solution. Typical methods and ingredients for preparing RFL-coated glass fibers are taught in U.S. Pat. Nos. 2,691,614; 2,817,616; 2,822,311; 3,973,071; and 3,925,286, all incorporated herein by reference.

The physical form of the glass fibers, whether sized and/or coated, may vary according to the particular method of fabricating the friction element. Thus, fiber glass in the form of strand, yarn, cord, chopped strand, roving, tape, cloth, mat, glass wool or the like may be used in forming the friction element. Preferably, in the fabrication of clutch facings, the glass fibers are in continuous form and RFL-coated to improve the burst strength of the friction element while, at the same time, permitting convenient friction element fabrication techniques.

Two types of RFL-coated glass fiber yarns have been found to be particularly useful in forming friction elements in accordance with the invention. These are the Hycor® RFL-coated glass fiber yarns manufactured by PPG Industries, Inc. and treatment 065 RFL-coated glass fiber yarn manufactured by Owens-Corning Fiberglass Corp.

The infusible organic fibers useful in the practice of the invention are those having a decomposition temperature greater than 400° F. and preferably above 600° F. and below 800° F. The upper degradation temperature limit is necessary so that carbonization of the fiber occurs during operation of the friction element. Further, the fiber must be insoluble in the particular binder composition and the solvent used in forming a particular friction element. Both natural organic fibers and synthetic organic fibers may be used as the infusible organic fiber. Typical natural organic fibers are cotton, jute, hemp, sisal, wool and the like. Typical regenerated organic fibers are viscose rayon, cuprammonium rayon and the like; and the synthetic fibers such as the aramid fiber sold by Dupont under the name Nomex and the like fibers which are within the hereinbefore specified degradation temperature range. A natural organic fiber is preferred and most preferred is cotton.

In preparing a friction element in accordance with the invention, the final friction element is to be asbestos free. The ratio of glass to infusible organic fiber must be controlled to provide the desired properties in the final friction element. If too much infusible organic fiber is used in relation to glass, the coefficient of friction and the strength of the element will be undesirably reduced. If insufficient infusible organic fiber is used in relation to glass fiber, the friction element will exhibit an undesirable aggressive characteristic. Thus a weight ratio range of 90:10 to 35:65 and more preferably 75:25 to 60:40 of glass to infusible organic fiber should be observed.

Thus, based on the weight of the glass, 10 to 185 percent by weight and preferably 33 to 67 percent by weight of infusible organic fiber should be used to form the friction element. Although asbestos-free friction elements previously have been suggested, such friction elements have exhibited an undesirable degree of aggressiveness and thus have not been widely accepted in the automotive industry. In accordance with this invention, the aggressiveness, manifested during operation of the friction element and imparted by the presence of glass fibers, has been reduced or alleviated by the addition of an effective amount of the infusible organic fiber.

In addition to improving the performance of friction elements whose fiber content consists of 100% glass, many combinations of glass and infusible organic fiber reduce the weight of the friction element. Such a reduction in weight is an overall objective of motor vehicle manufacturers to improve gas mileage along with other attendant advantages associated with weight reduction. Further, in clutch friction elements, lighter weight contributes to improved responsiveness during engagement.

A preferred method for incorporating the glass and the infusible organic fiber into the friction element is by fabricating a material composed of glass fibers and organic fibers. This may be for example a twisted cord composed of glass strand or yarn and an organic fiber strand or yarn in the desired weight ratios. Further, a fabric may be woven from glass yarn and organic fiber yarn in the desired ratio to form a cloth.

Friction elements embodying the present invention may be fabricated in accordance with procedures known to those skilled in the art. In general, the infusible organic fibers and the glass are impregnated with the formulated cross-linkable polymeric binder solution to form an impregnant. The binder solution should be of sufficiently low viscosity to wet the organic fibers and the glass. The impregnant is dried by evaporating the binder solvent to form a "B" stage. The B stage composition is molded under heat and pressure to cross-link the cross-linkable polymeric binder. The molded article may then be machined into its final form.

One commonly used technique for forming friction elements, and especially clutch facings, is to construct a preform by either of two methods to be discussed hereinafter. A "preform" is a loosely structured article in the B stage, composed of woven or wound reinforcing constituents impregnated with a cross-linkable binder, which roughly resembles the configuration of the final friction element. The preform is molded under heat and pressure to give it a final shape and cross-link the binder.

One particular method for constructing a preform involves the formation of a tape composed of one or more continuous strands of yarn or cord arranged in parallel relationship and impregnated with binder and cured to a B stage. When continuous glass and organic fibers are used, the strands or yarns of these materials may be untwisted or twisted to form a composite cord. When either the glass fibers or the organic fibers are in a discontinuous form, a single composition continuous strand or yarn is utilized. The continuous strands or yarns of fibrous material are passed through a dip tank containing the cross-linkable organic binder solution which is adjusted to a viscosity sufficient to provide for adequate impregnation of the fibrous components and pickup of the binder. The proper binder pickup is adjusted by a die, and the impregnant is passed through a drying tower maintained at a temperature sufficient to evaporate the solvent of the binder solution to form a B stage. The physical characteristics of a typical B stage impregnant are shown in U.S. Pat. No. 3,600,258. The B stage impregnant is stored in drums for further processing.

In fabricating a preform, one or more B stage impregnated tapes are fed into a machine of the type disclosed in U.S. Pat. No. 2,263,500, incorporated herein be reference, to produce a wound body (preform) of the desired size, shape and weight. The preform is subjected to heat and pressure to produce a cured friction element according to methods well known in the art.

A particular advantage of the present invention is that it provides a composition for preparing friction elements by using existing commercial practices and equipment.

A second technique for preparing a preform is to produce a woven fabric from glass yarn and cotton yarn. The fabric is impregnated with the cross-linkable polymeric binder, dried to a B stage, processed to form a preform of the desired shape, size and weight to be molded, finished, and machined. This technique is more fully disclosed in U.S. Pat. No. 2,096,692 which is incorporated herein by reference.

The following is a specific embodiment of the present invention; however, the invention is not to be construed as being limited to this embodiment for there are numerous possible variations and modifications.

EXAMPLE

A glass/cotton composite cord is prepared by plying together one end of 3s/2 cotton yarn and two ends of Hycor RFL-coated glass fibers. The Hycor RFL-coated glass fibers were K-15 1/0 having 1.5 twists per inch and 17 percent by weight of the RFL coating based on the weight of the glass. The three ends were plied together on a spinnable twister to form a single composite cord having two twists per inch and a weight of 191 yards per pound. Two of the single composite cords as formed above were plied together on an Allma twist frame to form a double composite cord having two twists per inch. The double composite cord has a weight of 400.7 yards per pound, a diameter of 0.068 ± 0.005 inch, and a composition of 61 percent by weight glass fibers and 39 percent by weight cotton fibers.

The double composite cord is passed through a dip tank containing the following composition:

| Ingredient | Parts By Weight on A Dry Solids Basis |
|---|---|
| Natural Rubber | 9.74 |
| Butadiene Styrene Rubber | 6.39 |
| Carbon Black | 7.37 |
| Clay | 4.00 |
| Graphite | 8.00 |
| Lead Sulphate | 12.00 |
| Zinc Oxide | 3.00 |
| Sulphur | 9.00 |

-continued

| Ingredient | Parts By Weight on A Dry Solids Basis |
|---|---|
| Rottenstone | 2.00 |
| Mica | 11.00 |
| Lime | 1.00 |
| Diphenylguanidine | 0.50 |
| Hexamethylene Tetramine | 0.50 |
| Phenolic Resin | 25.50 |
| | Adjusted to 50 percent by weight solids in a hydrocarbon solvent |

The impregnated cord is passed through a die, adjusted to provide a binder pickup to produce a friction element which is by weight 50 percent cross-linked matrix, and 50 percent glass and cotton. The impregnated cord is passed through a drying tower to dry the impregnant to a B stage. The B stage composition is collected in drums for further processing. The B stage impregnant is fed into a preform machine of the type disclosed in U.S. Pat. No. 2,263,500 and a preform is produced. The preform is molded for four minutes at 300° F. and 2000 psi to cross-link the polymeric binder. The article is removed from the mold and placed in an oven to raise its temperature from 300° F. to 400° F. over 1 hour. The article is baked at 400° F. for 5 hours, and removed from the oven.

The molded article is machined to form a 10 inch × 6¾ inch × 0.125 inch annular clutch facing. Two of such clutch facings are mounted on an "in line" clutch dynamometer having a 60 horsepower electric motor, and a Borg & Beck clutch and flywheel assembly. A torque arm is connected to the clutch plate assembly which transmits torque through a Hagan Thrustorq measuring device. The clutch is engaged and disengaged by means of an air cylinder.

The clutch facings are tested for wear by engaging the clutch 650 times in four second intervals with a plate load of 1200 pounds while the flywheel is driven at 1175 revolutions per minute. The torque is recorded on an Esterline-Angus recorder during the test. After the wear test a 15 second fade test is conducted. A second face test is conducted by engaging the clutch for 90 seconds at a plate load of 750 pounds.

The test results of the clutch facing of the Example were as follows:
Wear Test:
 0.0028 inches thickness loss on the pressure plate side
 0.0023 inches thickness loss on the flywheel side
The average torque during the test was 298.0 foot lbs. with an average coefficient of friction of 0.361 varying between 0.361 and 0.400.
First Fade Test (15 seconds): Coefficient of friction started at 0.44 and ended at 0.186.
Second Fade Test (90 seconds): Coefficient of friction started at 0.44 and ended at 0.28.
Clutch operation during the wear tests was observed by an experienced test operator; in all respects, clutch operation was deemed to be free of aggressive characteristics because the operation was smooth and quite throughout.

A clutch facing prepared in accordance with the Example was machined for a 1974 Ford F-100 with a 302 cubic inch engine and a 3 speed transmission. The clutch facing was mounted on the vehicle and road tested by experienced operators in Detroit city traffic for 5,000 miles. Clutch operation over the entire course was deemed to be free of aggressive chaacteristics.

A clutch facing prepared in accordance with the Example, when compared to asbestos-containing clutch facings, is equal in friction level and engagement characteristics, superior in burst strength and mating surface attack, and superior or equal in wear characteristics. Thus, overall, friction elements prepared in accordance with the invention are equal or superior to standard commercial friction elements while eliminating asbestos from the friction element composition.

It will be understood that various changes in specific materials and procedures may be made in the above Example without departing from the spirit of the invention. In this regard, the art has recognized that certain cement components may have an effect on the coefficient of friction exhibited by a finished friction element during its engagement of with a mating surface. The phenolic resin, elastomer and graphite constituents of the binder composition, when compared to the remaining constituents of the binder, tend to lower rather than raise the coefficient of friction. Thus formulation variations in the binder composition may be necessary to obtain the exact coefficient of friction which is desired for a particular end use. The formulation variation necessary to obtain a particular coefficient of friction must take into account the manufacturing requirements of a particular friction element. For example, when binder pickup is of concern during the processing of a cellulosic fibrous-containing friction element (i.e., when the porosity of the cellulosic matter must be maintenance within a given range), the proportion of coefficient of friction-lowering constituents can be reduced to raise the ultimate coefficient of friction to the desired level. Alternatively, when porosity is not a manufacturing variable, the organic fibrous component may be reduced to raise the ultimate coefficient of friction of the finished friction element to the desired level.

What is claimed is:

1. In a composition for use in forming an asbestos free friction element which exhibits aggressive behavior during operation, said composition including a cross-linkable polymeric binder and glass fibers, the improvement comprising:
   infusible organic fibers in said composition to mitigate said aggressive behavior, said infusible organic fibers being present in the range of 10 to 185 percent by weight based on the weight of the glass fibers.

2. The improvement of claim 1 wherein:
   said infusible organic fibers are present in the range of 33 to 67 percent by weight based on the weight of the glass fibers.

3. The improvement of claim 1 wherein:
   said infusible organic fibers are selected from the group consisting of cotton, jute, hemp, sisal, rayon, wool and aramid fibers.

4. The improvement of claim 3 wherein:
   said infusible organic fibers are cotton.

5. In a composition for use in forming a friction element, said composition including a cross-linkable polymeric binder and reinforcing constitutents, the improvement wherein said composition is asbestos-free and said reinforcing constituents comprise:
   infusible organic fibers and RFL-coated glass fibers in contact with said cross-linkable polymeric binder, the ratio by weight of said infusible organic fibers to said glass fibers being in the range of 10:90 to 65:35.

6. The improvement of claim 5 wherein:
   the ratio by weight of said infusible organic fibers to glass fibers is in the range of 25:75 to 40:60.

7. The improvement of claim 5 wherein said infusible organic fibers are selected from the group consisting of cotton, jute, hemp, sisal, rayon, wool and aramid fibers.

8. The improvement of claim 7 wherein:
   said infusible organic fibers are cotton.

9. The improvement of claim 5 wherein:
   said RFL is present in the range of 5 to 50 percent by weight based on the weight of the glass fibers.

10. The improvement of claim 9 wherein:
    said RFL is present in the range of 15 to 35 percent by weight based on the weight of the glass fibers.

11. In an intermediate, shaped article for use in forming an asbestos-free friction element which exhibits aggressive behavior during operation, said article including a cross-linkable polymeric binder and glass fibers, the improvement comprising:
    infusible organic fibers in said article to mitigate said aggressive behavior, said infusible organic fibers being present in the range of 10 to 185 percent by weight of the glass fibers.

12. The improvement of claim 11 wherein:
    said infusible organic fibers are present in the range of 33 to 67 percent by weight based on the weight of the glass fibers.

13. The improvement of claim 11 wherein:
    said infusible organic fibers are selected from the group consisting of cotton, jute, hemp, sisal, rayon, wool and aramid fibers.

14. The improvement of claim 13 wherein:
    said infusible organic fibers are cotton.

15. In an intermediate shaped article for use in forming a friction element, said article including reinforcing constitutents impregnated with a cross-linkable polymeric binder, the improvement wherein said article is asbestos-free and said reinforcing constituents comprise:
    infusible organic fibers and elastomer coated glass fibers present in a weight ratio in the range of 10:90 to 65:35.

16. The improvement of claim 15 wherein:
    the ratio by weight of said infusible organic fibers to glass fibers is in the range of 25:75 to 40:60.

17. The improvement of claim 15 wherein:
    said infusible organic fibers are selected from the group consisting of cotton, jute, hemp, sisal, rayon, wool and aramid fibers.

18. The improvement of claim 17 wherein:
    said infusible organic fibers are cotton.

19. The improvement of claim 15 wherein:
    said elastomer is RFL which is present in the range of 5 to 50 percent by weight based on the weight of the glass.

20. The improvement of claim 19 wherein:
    said RFL is present in the range of 15 to 35 percent by weight based on the weight of the glass.

21. The improvement of claim 15 wherein:
    said infusible organic fibers and glass fibers are in the form of yarn.

22. The improvement of claim 21 wherein:
    at least one strand of said infusible organic yarn and at least one strand of said glass yarn are in a substantially side-by-side relationship in the form of tape.

23. The improvement of claim 20 wherein:
    said infusible organic yarn and said glass yarn are woven together to form a fabric.

24. In an asbestos free friction element which exhibits aggressive behavior during operation, having a cross-linked polymeric matrix and having dispersed therethrough glass fibers, the improvement comprising:
infusible organic fibers dispersed throughout said element to mitigate said aggressive behavior, said infusible organic fibers being present in the range of 10 to 185 percent by weight based on the weight of said glass fibers.

25. In a friction element having a matrix including a cross-linked polymeric binder and having dispersed therethrough reinforcing constituents, the improvement wherein:
said element is asbestos-free and said reinforcing constituents comprise:
infusible organic fibers and RFL-coated glass fibers present in a weight ratio in the range of 10:90 to 65:35.

26. The improvement of claim 25 wherein:
said RFL is in bonding relationship with said fibrous glass and said matrix.

27. In an asbestos-free friction element including a cross-linked polymeric binder and glass fibers the improvement comprising:
said element containing infusible organic fibers to reduce aggressiveness during the operation of said element, said infusible organic fibers being present in said element in the range of 10 to 185 percent by weight based on the weight of said glass fibers in said element.

28. In a friction element having a matrix including a cross-linked polymeric binder and having dispersed therethrough fibrous reinforcing constituents, the improvement wherein:
said element is asbestos free and said reinforcing constituents comprise 25 to 40 parts by weight cotton fibers; and 60 to 75 parts by weight glass fibers which are RFL-coated.

29. The friction element of claim 28 wherein:
said reinforcing constituents comprise 30 to 65 percent by weight of the friction element.

30. In a composition for use in forming an asbestos-free friction element which exhibits aggressive behavior during operation, said composition including a cross-linkable polymeric binder and glass fibers, the improvement comprising:
infusible organic fibers present in said composition in the range of 2 to 50 percent by weight based on the total weight of said improved composition.

31. The improvement of claim 30 wherein:
said range is 7.5 to 25 percent.

32. In a composition for use in forming a friction element, said composition including a cross-linkable polymeric binder and reinforcing constituents, the improvement wherein said composition is asbestos-free and said reinforcing constituents comprise:
infusible organic fibers and glass fibers which taken together are present in the range of 20 to 75 percent by weight based on the total weight of said improved composition.

33. The improvement of claim 32 wherein:
said range is 30 to 65 percent.

34. In an intermediate, shaped article for use in forming an asbestos-free friction element which exhibits aggressive behavior during operation, said article including a cross-linkable polymeric binder and glass fibers, the improvement comprising:
infusible organic fibers in said article to mitigate said aggressive behavior, said infusible organic fibers being present in the range of 2 to 50 percent by weight based on the total weight of said improved article.

35. The improvement of claim 34 wherein:
said range is 7.5 to 25 percent.

36. In an intermediate shaped article for use in forming a friction element, said article including reinforcing constituents impregnated with a cross-linkable polymeric binder, the improvement wherein said article is asbestos-free and said reinforcing constituents comprise:
infusible organic fibers and elastomer coated glass fibers which taken together and present in the range of 20 to 75 percent by weight based on the total weight of said improved article.

37. The improvement of claim 36 wherein:
said range is 30 to 65 percent.

* * * * *

UNITED STATES PATENT AND TRADEMARK OFFICE
CERTIFICATE OF CORRECTION

PATENT NO. : 4,130,537
DATED : December 19, 1978
INVENTOR(S) : George J. Bohrer

It is certified that error appears in the above-identified patent and that said Letters Patent are hereby corrected as shown below:

Column 4, line 67, after "percent" --by-- should be added.

Column 8, line 43, "face" should read --fade--.

Signed and Sealed this

Twelfth Day of June 1979

[SEAL]

Attest:

RUTH C. MASON
Attesting Officer

DONALD W. BANNER
Commissioner of Patents and Trademarks